United States Patent
Avasthi et al.

(10) Patent No.: US 8,291,436 B2
(45) Date of Patent: Oct. 16, 2012

(54) SYNCHRONIZATION OF EVENT HANDLERS

(75) Inventors: Adhyas Avasthi, Sunnyvale, CA (US); Petr Vandrovec, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1140 days.

(21) Appl. No.: 12/166,516

(22) Filed: Jul. 2, 2008

(65) Prior Publication Data

US 2010/0005479 A1 Jan. 7, 2010

(51) Int. Cl.
*G06F 15/163* (2006.01)
(52) U.S. Cl. .................................... 719/318; 713/320
(58) Field of Classification Search .................. 719/318; 710/263; 713/320
See application file for complete search history.

(56) References Cited

U.S. PATENT DOCUMENTS

| | | | |
|---|---|---|---|
| 7,254,726 B2* | 8/2007 | Kwatra et al. | 713/320 |
| 2004/0216137 A1* | 10/2004 | Warwick et al. | 719/318 |
| 2005/0102543 A1* | 5/2005 | Kwatra et al. | 713/320 |
| 2006/0075171 A1* | 4/2006 | Wei | 710/260 |
| 2006/0168593 A1* | 7/2006 | Chen et al. | 719/318 |
| 2007/0143640 A1* | 6/2007 | Simeral et al. | 713/320 |

OTHER PUBLICATIONS

Watanabe, T., "ACPI Implementation on FreeBSD" (2002), Proceedings of the FREENIX Track: 2002 USENIX Anuual Technical Conference, Perkely, CA, USA, pp. 121-131 [retrieved from http://www.usenix.org/events/usenix02/tech/freenix/full_papers/watanabe/watanabe.ps].*

Hewlett-Packard Corp. et al., "Advanced Configuration and Power Interface Specification" (Oct. 10, 2006), pp. i-611 [retrieved from http://www.acpi.info/DOWNLOADS/ACPIspec30b.pdf].*

* cited by examiner

*Primary Examiner* — Hyung S. Sough
*Assistant Examiner* — Brian Wathen

(57) ABSTRACT

A method for synchronizing the handling of events in a computer using the Advanced Configuration and Power Interface (ACPI) standard is presented, wherein an ACPI Notification Queue (ANQ) is provided to store events, such that such events can be handled in first-in-first-out order.

18 Claims, 3 Drawing Sheets

SYNCHRONIZATION OF EVENT HANDLERS

FIELD OF THE INVENTION

Embodiments of the present invention relate to the field of computer software and methods for managing the timing of event handlers.

BACKGROUND

Modern computers incorporate a variety of energy and power saving features that provide for turning off or substantially reducing the power requirements of various portions of their hardware which are not actively being used. Specific details vary and may be device specific, depending on the capabilities of the associated hardware, and available software control. Standardized protocols for power management became available starting in the early 1990s.

The first widely used standard, Advanced Power Management (or APM), assigned power management control to the BIOS, with limited intervention from the operating system. This was then replaced by the Advanced Configuration and Power Interface (ACPI) standard, an open industry standard first released in December 1996 and developed collaboratively by Hewlett-Packard Development Company, L.P.; Intel Corporation; Microsoft Corporation; Phoenix Technologies, Ltd.; and Toshiba Corporation. This standard put the operating system in control of power management and extended features previously made available only to laptop computers to desktop computers and servers.

ACPI requires compliant hardware including support for ACPI registers. The CPU, motherboard, and operating system must all be designed with support for ACPI features. A unique ACPI Machine Language (AML) is defined for implementing power-event handlers. The AML code is in the BIOS but is interpreted by the operating system.

ACPI defines sets of states including global sleep states (G0-G3 and S0-S5), device sleep states (D0-D3), CPU sleep states (C0-C3), and bus sleep states (B0-B3). Changes in state are under operating system control, but are typically triggered by a variety of interrupt events such as timers, mouse and keyboard events, wake-on-LAN, and hot-plugging and unplugging of devices. In a physical computing environment, interrupt events rarely conflict with each other, and no special methods are specified in the ACPI standard to manage the sequencing of event handling. Typically, an event handler can respond within a few milliseconds, and even if it takes a few seconds for the hardware to fully respond, the likelihood of another event in that time is low. However, there can be situations where multiple power management events occur nearly simultaneously.

A virtual machine (VM) is a software abstraction, or "virtualization," of an actual physical computer system. Each VM typically mimics the general structure of a physical computer and as such will usually have both virtual system hardware and guest system software. The virtual system hardware typically includes at least one virtual CPU, virtual memory, at least one storage device such as a virtual disk, and one or more virtual devices. All of the virtual hardware components of the VM can be implemented in software to emulate corresponding physical components. The guest system software typically includes a guest operating system and drivers as needed.

A VM must also be able to respond to power management events.

SUMMARY

In one embodiment, a method for synchronizing the handling of events in a computer using the Advanced Configuration and Power Interface (ACPI) standard is described, wherein an ACPI Notification Queue (ANQ) is provided to store events, such that such events can be handled in first-in-first-out order.

In another embodiment, a method for handling events in a computer using the Advanced Configuration and Power Interface (ACPI) standard is provided. The method includes creating a plurality of ACPI Notification Queues (ANQs). Each of the plurality of ANQs are in communication with one of a plurality of controllers and one of a plurality of ACPI event handlers. Events from the plurality of controllers are stored in the ANQs. The events from one of the plurality of controllers are stored in a corresponding one of the ANQs. The method further includes responding to events in each of the ANQs in first-in-first-out order.

DETAILED DESCRIPTION

Even though a VM acts like a physical computer, the details of how the VM responds may differ from a physical machine. In general, since all devices, and even the CPU itself, are virtualized, "powering up" and "powering down" are virtual concepts: resources for the associated virtual component are simply allocated and deallocated. Power management for the physical components which host a VM and its virtual components is separately managed by the operating system for the host physical computer. Unlike a physical machine, VMs may need to handle large numbers of power management events in a short time. For example it is not uncommon when bringing up a new VM to "power up" a long list of virtual devices "at once." Some of these devices may interact with one another, and it may be necessary for certain devices to be available before others are added. Thus, there is a need to specify the priority and sequence for handling an extensive list of power management events in a virtual environment. When the handling of one power management event must be completed before a second event can be handled, the only way available under the ACPI standard to control the timing is to wait to trigger the second event until it can be verified that the handling of the first event is complete.

The following specific definitions apply to terms and phrases used throughout this specification and claims:

VM: a "virtual machine" which is a software abstraction, or "virtualization," of an actual physical computer system. A "hypervisor" is often used to create and manage a VM, although there are other names used for some types of software that create and manage VMs.

ACPI: "Advanced Configuration and Power Interface," an open industry standard for power management in computer devices.

ANQ: "ACPI Notification Queue(s)," a data structure storing a list of power management events to be processed in first-in-first-out order.

PCI: "Peripheral Component Interconnect," a computer bus for attaching peripheral devices to a computer motherboard. "PCI devices" are typically implemented as cards which plug into a PCI bus.

PCI Express (also PCIe): a computer expansion card interface format. PCI Express represents a newer device interface standard than PCI, but both may exist in the same machine.

NIC: "Network Interface Card," a device (e.g., a PCIe device) which provides communications interface with a network.

IPv4 and IPv6: two versions of "Internet Protocol" Standards. They describe the network layer for packet-switched networks.

wake-on-LAN: an interrupt generated when another machine on the Local Area Network (LAN) needs to access a particular computer.

Figure 1:
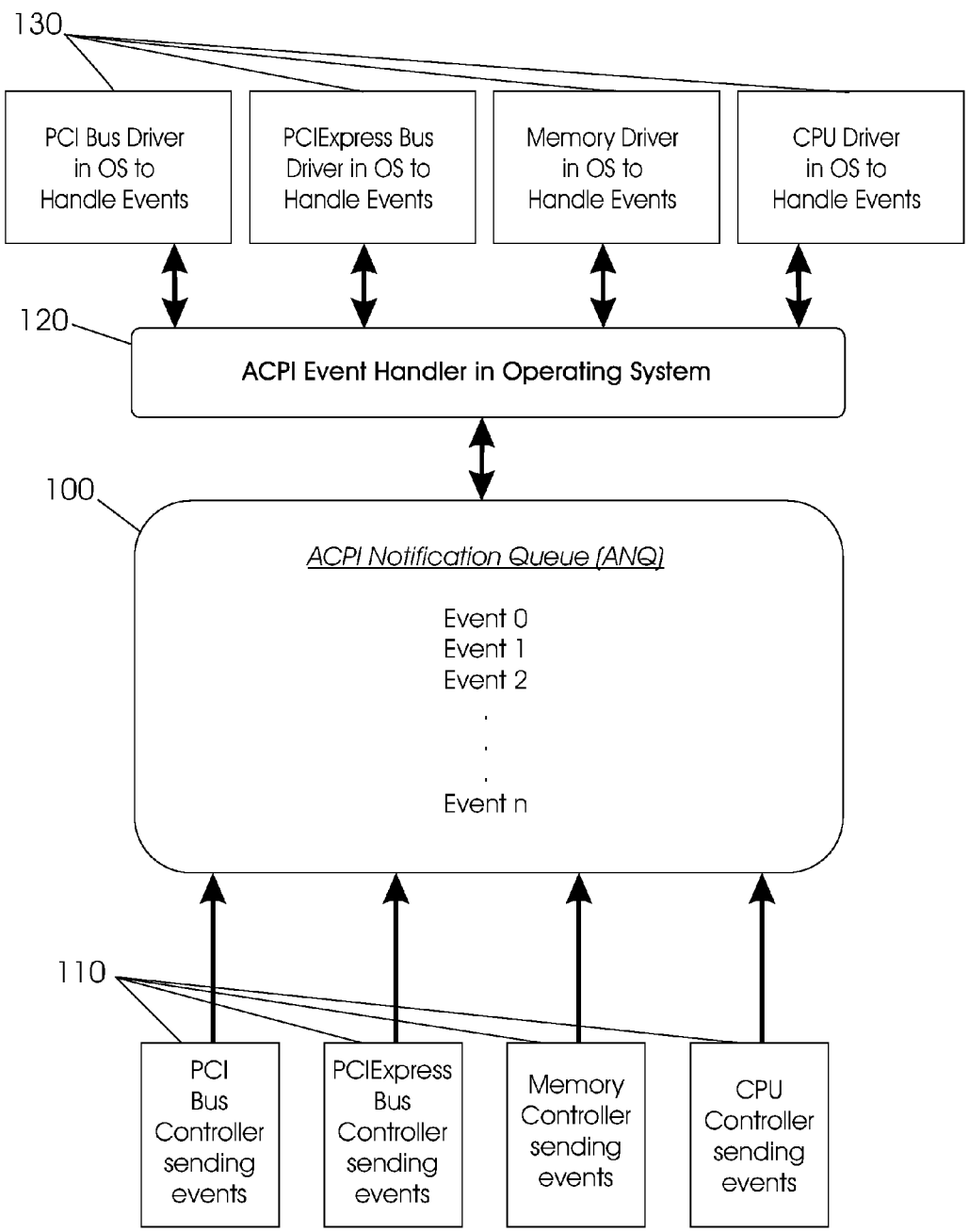
FIG. 1 shows a schematic diagram of the synchronization of power management event handling with a single queue.
Figure 3:
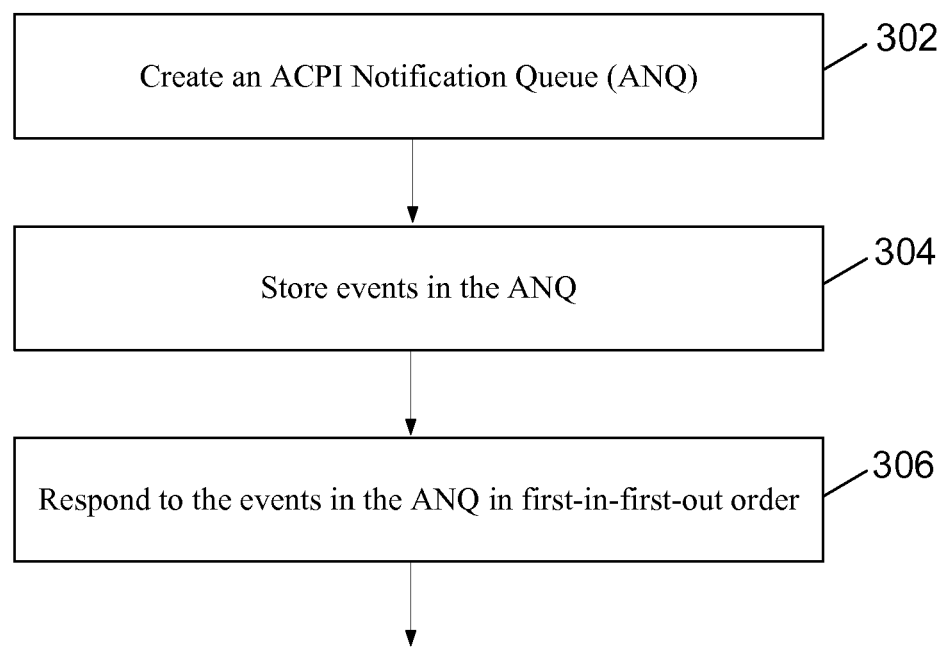
FIG. 3 is a flow diagram of an exemplary method for handling events in a computer using the Advanced Configuration and Power Interface (ACPI) standard.

Embodiments of methods for synchronizing power management event handling will now be described in detail with reference to FIG. 1 and FIG. 3. The methods add new functionality to those provided in the ACPI standard. Referring to FIG. 1 and FIG. 3, a new data structure called the ACPI Notification Queue (ANQ) 100 is provided at step 302 in FIG. 3. At step 304 in FIG. 3, power management events are entered from various hardware controllers 110 into the ANQ in first-in-first-out (FIFO) order. At step 306 in FIG. 3, the ACPI Event Handler 120 responds to events in order (e.g., first-in-first-out order) from the ANQ 100 and distributes them to appropriate drivers 130. In one embodiment the ACPI Event Handler 120 resides in the operating system. In other embodiments, the ACPI Event Handler 120 can be embedded in the hardware. Similarly, in one or more embodiments, the ANQ 100 can be implemented in a software component. Alternatively, in other embodiments, the ANQ can also be embedded in a hardware component.

Figure 2:
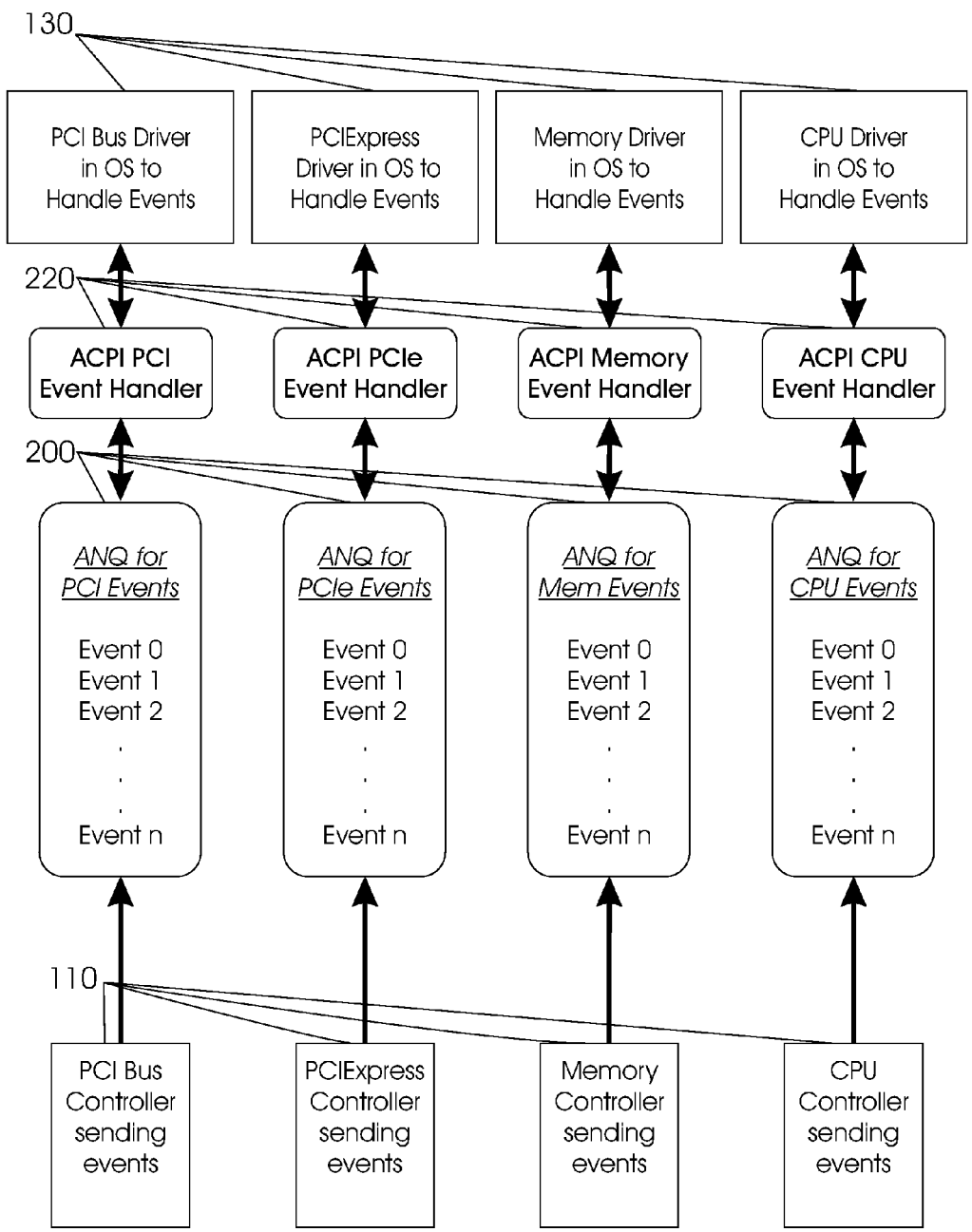
FIG. 2 shows a schematic diagram of the synchronization of power management event handling with multiple queues.

In some embodiments, it can be advantageous to create a plurality of queues which can be handled in parallel. Referring to FIG. 2, an ANQ can comprise separate queues 200 for events that are handled separately by event handlers 220. In a particular embodiment, separate queues are provided for PCI devices, PCI Express devices, memory, and processors as illustrated for the queues 200 in FIG. 2. If there are no timing issues between events in the different queues, they can be processed in parallel; the events that need to be synchronized reside together in a queue, and those that do not require synchronization are in different queues.

In another embodiment, one queue can handle memory and processors, a second queue can handle PCI and PCI Express devices, and a third queue can handle wakeup interrupts.

In general, multiple queues can be processed in parallel, and separate queues can be designated for events that might need to be handled in a mutually exclusive manner. Relative order of event processing is typically important within one queue, but not between queues. Further, in one or more embodiments, the selection of events to group together into a particular queue can be determined by computer motherboard layout. In some embodiments, hardware routing costs can be saved, because the hardware for hot-pluggable devices is typically located on one side of the motherboard (closer to each other than to memory or CPU), while memory and CPU are often located elsewhere, closer to each other than to the hot-pluggable devices. To trigger a power management event, any of these types of hardware (e.g., PCI, PCI Express, memory, CPU) would have to toggle a signal and communicate. It can be advantageous to distribute this effort.

In one embodiment, the ANQ 100 or 200 can be stored in memory space which is pre-configured in a chipset memory address range reserved for operating systems. When an event is triggered in hardware 10, an entry is allocated in memory for the appropriate queue, and a corresponding power management event is triggered. The power management code (executing in either System Management Mode [SMM] or in the ACPI driver) reads the next entry in the ANQ 100. Each entry contains information about the event (e.g., event type and device address). After the appropriate response is complete, the power management code acknowledges the event to the hardware which then deletes the event from the queue and triggers another power management interrupt as long as there are additional events in the queue.

An example where time synchronization between entries in a queue is important is provided by the hot-plugging of two network controllers (which, in a particular embodiment, can be PCI cards). If the operating system is already configured to have one particular configuration for eth0 (for which it is desired that an IPv6-capable network interface card [NIC] be used) and another configuration for eth1 (for which it is desired that a different IPv4-capable NIC be used), then it is necessary to ensure that the hot-plug events always happen in the same sequence (IPv6 NIC, followed by IPv4 NIC). Without an ANQ, it would be necessary to issue one hot-plug event for the IPv6 NIC and then wait for the configuration to be assigned in the guest operating system in the VM before issuing the second hot-plug event for the IPv4 NIC. Otherwise, the assignments could happen in reverse and the wrong cards might be used. With an ANQ, no such timing uncertainty exists. As long as the events are entered into the ANQ in the correct order by hot-plugging the devices in the desired order, then the ANQ will ensure that the cards are properly assigned in the desired configuration to the operating system.

A second example is provided for computer architectures based on CPUs from Advance Micro Devices, Inc. where the processor has a built-in memory controller, and each processor slot has some adjacent memory slots which can be controlled by that processor's memory controller. In this case, if one wishes to hot-plug memory and a processor into a system, it is necessary to hot-plug the processor first, followed by the memory, because the memory cannot be initialized or identified until the controller exists, and it is present on the processor. Using an ANQ, it is not necessary to wait for the processor to be initialized before hot-plugging the memory; it is sufficient to hot-plug the processor before the memory (without waiting for processor initialization) so that the two events are entered into the ANQ in the correct order.

As a third example, the above two examples can be combined. Now four events are to be processed: two network cards, some memory, and a processor are to be hot-plugged. There are no timing issues between the network cards on the one hand and the memory and processor on the other. Thus, optimum performance can be achieved by using two ANQs, one for the network cards and one for the memory and processors. The events that need to be synchronized reside together in a queue, and those that do not require synchronization are in different queues, that can be processed in parallel.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for handling events in a computer using the Advanced Configuration and Power Interface (ACPI) standard, the method comprising:
    creating an ACPI Notification Queue (ANQ), the ANQ being in communication with a plurality of controllers and a ACPI event handler, and wherein the ANQ comprises a plurality of queues for different types of events;
    storing events in the ANQ; and
    responding to the events in the ANQ in first-in-first-out order.

2. The method of claim 1, wherein the different types of events comprise at least one of memory events, CPU events, device events, wake-on-LAN events, timer events, keyboard events, and mouse events.

3. The method of claim 2, wherein a plurality of the different types of events are grouped into a single type of event.

4. The method of claim 2, wherein the device events comprise events for devices connected to more than one bus, wherein separate queues are provided for each bus.

5. The method of claim 1, wherein events in said plurality of queues are processed in parallel, events in each queue being processed in first-in-first-out order.

6. The method of claim 1, wherein the plurality of controllers include at least one of a PCI Bus controller, a PCIExpress controller, a Memory controller, and a CPU controller.

7. A method for handling events in a computer using the Advanced Configuration and Power Interface (ACPI) standard, the method comprising:
    creating a plurality of ACPI Notification Queues (ANQs), each of the plurality of ANQs being in communication with one of a plurality of controllers and one of a plurality of ACPI event handlers;
    storing events from the plurality of controllers in the ANQs, wherein the events from one of the plurality of controllers are stored in a corresponding one of the ANQs; and
    responding to events in each of the ANQs in first-in-first-out order.

8. The method of claim 7, wherein the events comprise at least one of memory events, CPU events, device events, wake-on-LAN events, timer events, keyboard events, and mouse events.

9. The method of claim 8, wherein the device events comprise events for devices connected to more than one bus, wherein separate queues are provided for each bus.

10. The method of claim 8, wherein the one of the plurality of controllers is in communication with one of a plurality of device drivers.

11. The method of claim 7, wherein the plurality of controllers include at least one of a PCI Bus controller, a PCIExpress controller, a Memory controller, and a CPU controller.

12. The method of claim 7, wherein the plurality of ACPI event handlers include at least one of a PCI event handler, a PCI event handler, a Memory event handler, and a CPU event handler.

13. A system for handling events in a computer using the Advanced Configuration and Power Interface (ACPI) standard, the system comprising:
    at least one controller;
    an ACPI event handler; and an ACPI Notification Queue (ANQ), the ANQ being in communication with the at least one controller and the ACPI event handler, and wherein the ANQ comprises a plurality of queues for different types of events; and a processor programmed to:

store events in the ANQ; and respond to the events in the ANQ in first-in-first-out order.

14. The system of claim 13, wherein the different types of events comprise at least one of memory events, CPU events, device events, wake-on-LAN events, timer events, keyboard events, and mouse events.

15. The system of claim 14, wherein a plurality of the different types of events are grouped into a single type of event.

16. The system of claim 14, wherein the device events comprise events for devices connected to more than one bus, wherein separate queues are provided for each bus.

17. The system of 13, wherein events in the plurality of queues are processed in parallel, events in each queue being processed in first-in-first-out order.

18. The system of claim 13, wherein the at least one controller is one of a PCI Bus controller, a PCIExpress controller, a Memory controller, or a CPU controller.

* * * * *